United States Patent
Sinclair

(10) Patent No.: US 11,040,493 B1
(45) Date of Patent: Jun. 22, 2021

(54) INTUITIVE CREATION SYSTEM FOR ADDITIVE MANUFACTURING

(71) Applicant: Joseph Matthew Sinclair, Sinking Springs, PA (US)

(72) Inventor: Joseph Matthew Sinclair, Sinking Springs, PA (US)

( * ) Notice: Subject to any disclaimer, the term of this patent is extended or adjusted under 35 U.S.C. 154(b) by 0 days.

(21) Appl. No.: 17/106,131

(22) Filed: Nov. 29, 2020

Related U.S. Application Data

(60) Provisional application No. 62/945,139, filed on Dec. 7, 2019.

(51) Int. Cl.
| | |
|---|---|
| *B29C 64/393* | (2017.01) |
| *B33Y 50/02* | (2015.01) |
| *G06F 30/17* | (2020.01) |
| *B33Y 30/00* | (2015.01) |

(52) U.S. Cl.
CPC .......... *B29C 64/393* (2017.08); *B33Y 30/00* (2014.12); *B33Y 50/02* (2014.12); *G06F 30/17* (2020.01)

(58) Field of Classification Search
CPC ....... B29C 64/393; B33Y 50/02; B33Y 30/00; G06F 30/17
See application file for complete search history.

(56) References Cited

U.S. PATENT DOCUMENTS

| | | | |
|---|---|---|---|
| 9,912,915 B2 | 3/2018 | Sinclair | |
| 10,437,698 B2 | 10/2019 | Sinclair | |
| 2014/0271964 A1* | 9/2014 | Roberts, IV | B29C 64/393 425/150 |
| 2018/0117850 A1* | 5/2018 | Schwartz | B33Y 50/02 |

* cited by examiner

*Primary Examiner* — Yuhui R Pan
(74) *Attorney, Agent, or Firm* — James R. McDaniel

(57) ABSTRACT

Described herein is an Intuitive Creation System for Additive Manufacturing (AM) Devices which automates the design and manufacturing process in order to minimize or eliminate the need to teach and train new users in the art of Additive Manufacturing (AM). This system and methodology allows anyone, with little to no technical know-how, to successfully operate an AM device to produce products that improve their quality of life, on demand, locally, and during events that cause disruption of traditional global manufacturing supply chains. Additionally, the described systems and methods also allow anyone to design and create products with little to no prior technical know-how. This is accomplished by integrating computational systems and processors into the physical device such that 3D model data can be interrupted and translated into actions by the AM device without the need for a highly trained operator or user.

10 Claims, 4 Drawing Sheets

INTUITIVE CREATION SYSTEM FOR ADDITIVE MANUFACTURING

CROSS-REFERENCE TO RELATED APPLICATIONS

This application claims the benefit of U.S. Provisional Patent Application 62/945,139, filed on Dec. 7, 2019 by Joseph M. Sinclair, entitled "INTUITIVE END-TO-END CREATION STEAM AND METHODS OF USING SAME" and is hereby incorporated by reference to the extent that it does not conflict with the current disclosure.

BACKGROUND

Field of Invention

The present invention relates to additive manufacturing (AM) devices, and more specifically, is directed toward versions of these AM devices that enable non-technical users to reap the benefits offered by these AM manufacturing devices without the need to overcome the extensive learning curve that currently exists.

Description of Related Art

Additive manufacturing, ("AM"), also called "3D Printing", builds products layer by layer. AM usually takes a longer time to manufacture a product as compared with conventional manufacturing which may use, for example, milling and drilling. Finally, AM technology is effective for the fabrication of low-volume production, such as in the case of prototyping.

From Prototypes to End-Use Products

Since AM's introduction in the 1980's, 3D printing technology has been focused primarily on non-end use applications such as prototypes and visual aids. However, AM technology has seen significant improvement over the last decade, many of those improvements focusing on the creation of AM devices capable of producing end-use parts made out of material such as metals. As the AM market continues to grow, the industry demand for an AM educated workforce has become a primary focus.

AM is often viewed as having groundbreaking potential relative to the fabrication of customizable consumer products, industrial components, etc. As AM, aka 3D printing, adoption has increased, AM's undesirable issues relative to traditional manufacturing techniques have begun surfacing.

Presently, AM adoptability is suffering from an inability to scale AM production to mass manufacturing levels, relative to traditional mass manufacturing techniques for end-use products. It has become apparent that highly trained operators are necessary for successful operation of AM equipment. In response to this, higher educational institutions have begun offering programs and courses specifically for 'Additive Manufacturing & Design' to help the existing workforce overcome the steep learning curve offered by AM.

Traditional mass manufacturing methodologies and techniques, such as injection molding, that are capable of scaling to meet mass manufacturing demands, are reliable, economical, and fast. These three principles enable traditional manufacturing methodologies to support the reliable production of billions of products around the globe every year. In contrast, AM methodologies are currently unreliable, expensive, slow relative to traditional manufacturing methods, as well as being difficult to teach and learn. Since commercial production of retail and consumer products often requires millions of components produced per year, this clearly has become problematic.

AM technology is unlikely to replace traditional high-volume manufacturing of retail and consumer products under the traditional manufacturing supply chain as these products are often designed such that they are most easily mass produced using traditional manufacturing methods. For retail and consumer products, AM technologies are not an economically feasible solution as compared to technologies such as injection molding.

There have been advances, such as U.S. Pat. Nos. 9,912,915 and 10,437,698 by Joseph M. Sinclair, which allow a single highly trained operator to run multiple 3D printers simultaneously. These methods enable scalable production of AM products by enabling highly trained operators to operate multiple AM devices (3D printers) simultaneously.

Since highly educated operators are currently limited, the solutions laid out in these prior patents provides an avenue to maximize the productivity of these operators. However, it does not address the need for a simpler and more intuitive approach to AM such that non-technical users can utilize AM devices without having to overcome an extensive learning curve.

A solution that eliminates the AM learning curve would allow for maximum utilization of decentralized manufacturing which is one of AM's main benefits when competing against traditional manufacturing technologies. In turn, such a solution would allow non-technical users to produce retail and consumer goods locally.

Reliance on Technical Know-how

Existing AM processes heavily rely on highly trained personnel to properly design products for specific manufacturing methods. Currently, design and manufacturing skill sets are often learned independently. Additionally, these skill sets require extensive training and have a steep learning curve. The combination of these factors creates a small subset of personnel with the necessary skills required to design for manufacturing processes and even a smaller group that can design for AM processes.

New forms of manufacturing, such as 3D printing, allow for decentralized manufacturing and an expression of creativity by individuals not in the manufacturing fields. However, the ability for a non-technical user to quickly learn design methods and AM processes is unlikely. Conquering the learning curve of operating an AM device is also difficult for non-technical users. These issues restrict the average individual from utilizing AM technologies.

Decentralized Manufacturing Capability

AM continues to remain a promising manufacturing alternative for the production of products in locations that cannot support traditional manufacturing capabilities under normal circumstances or when natural disasters or pandemics temporarily interrupt traditional manufacturing methods. When the traditional manufacturing supply chain, which requires global production and shipment of products, becomes compromised—AM technology is then capable of filling the void for the local commercial production of consumer and retail products. This methodology enables local businesses, communities, and residents to produce the commercial and consumer goods necessary to maintain their quality of life until traditional manufacturing supply chains can be re-established. However, existing AM technology and systems are not as easy to use or as simple as just pressing print. This prevents the average consumer household from utilizing AM as a means by which to produce consumer goods as needed during global supply chain interruptions. Currently, there are few AM systems or methods that are capable of enabling the average consumer to create and/or produce retail and consumer products on their own without having to overcome a significant learning curve.

To reduce the technical knowledge requirements for designing and manufacturing unique components, an intuitive end-to-end manufacturing solution has been developed. This solution enables the average individual to learn how to design and fabricate customized components within minutes and without any prior experience. Using this solution, individuals can learn and utilize these skills to manufacture completely customized components that improve the quality of their lives.

Consequently, there is a need for average consumers to produce consumer goods in a decentralized manner without the need to overcome the existing, burdensome 3D printing learning curve. AM technology and devices have the potential to significantly improve the lives of the masses, however technical know-how remains the biggest barrier to entry.

BRIEF DESCRIPTION OF THE DRAWINGS

The advantages of the system described in this application will become more apparent when read with the exemplary embodiment described in the specification and shown in the drawings. Further, in the accompanying drawings and description that follow, like parts are indicated throughout the drawings and description with the same reference numerals, respectively. The figures may not be drawn to scale and the proportions of certain parts have been exaggerated for convenience of illustration.

SUMMARY

The current invention may be embodied as an Additive Manufacturing (AM) device or system that attaches to an AM device and which utilizes a series of attached and detached computational systems and processors to automate the creation and selection of 3D models and fabrication thereof. To improve the likelihood of a successful output from the AM device fabrication process, the computational systems and processors use mathematical algorithms to process CAD files in preparation for the fabrication process. This system and method significantly reduce process variability that is often caused by operator input. This system and method provide a means to produce AM products successfully, but does not require a user to possess significant technical know-how.

DETAILED DESCRIPTION

Theory

AM systems and devices come in many varying sizes, use different processes for deposition, and can utilize many different types of materials. However, nearly every one of these AM devices requires an operator, engineer, technician, etc. to perform a similarly defined procedure that results in the successful production of components by an AM device. Furthermore, these procedures require a significant amount of learning, education, and practice in order to be conveyed to new users. But once understood by new users, these users can repeat this defined process to achieve desired AM production outcomes.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
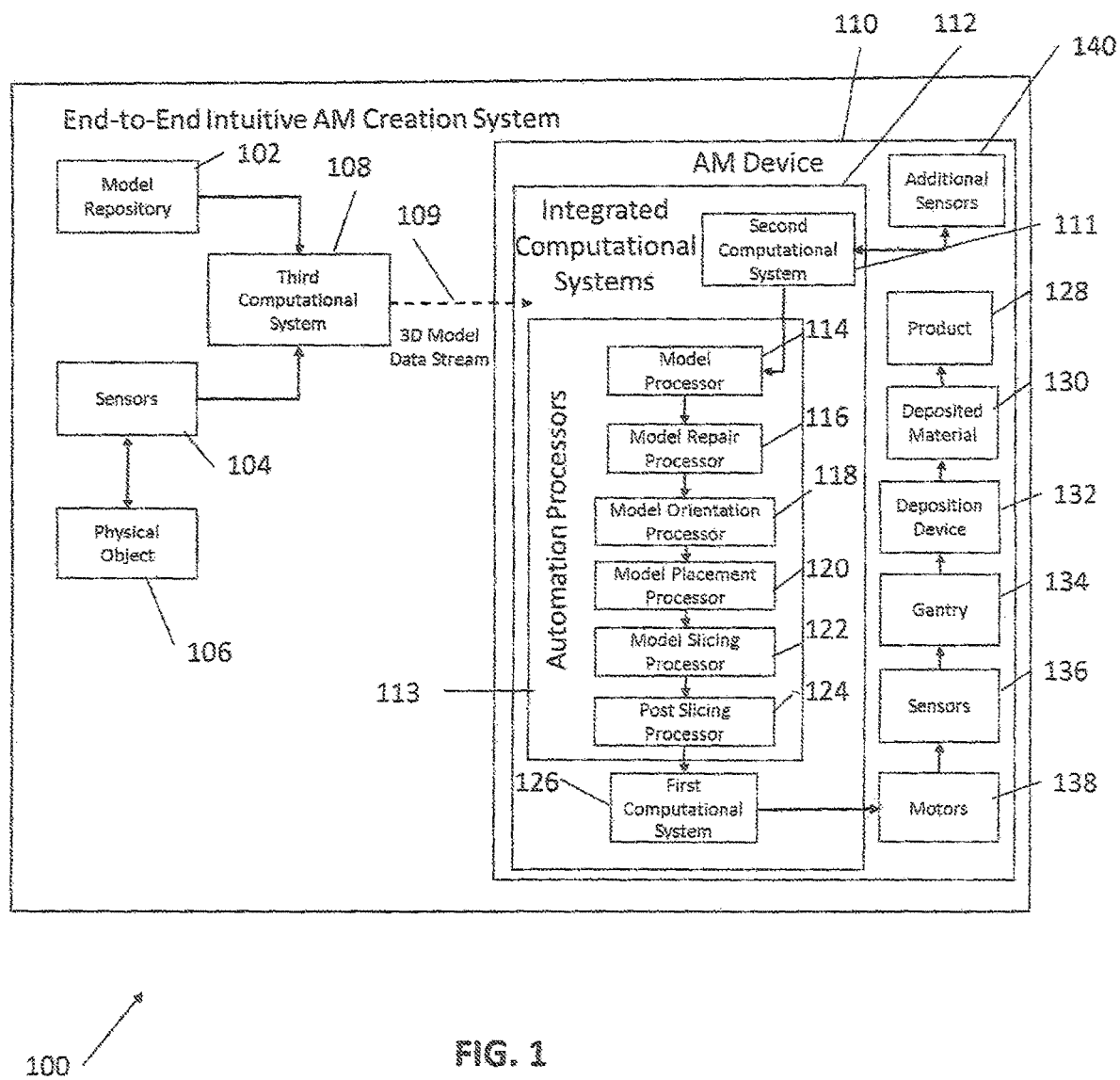
FIG. 1 illustrates an intuitive creation system for additive manufacturing, according to one embodiment of the current invention.

FIG. 1 illustrates an intuitive creation system 100 for additive manufacturing, according to an example embodiment. System 100 includes model repository 102, sensors, 104, physical object 106, a third computational system 108, and additive manufacturing (AM) device 110 having integrated computation systems 111, automation processors 113, product 128, deposited material 130, deposition device 132, gantry 134, sensors 136 and motors 138.

With respect to third computational system 108, the third computational system 108, preferably, is the computational system that lives beyond the AM device 110 itself and acts as an interface between the user/operator and the AM device 110. This third computational system 108 allows for a user to interact with the AM device 110 as well as create or find 3D models, in the form of 3D model data, that can be shared with the AM device 110 and more specifically, the integrated computational systems 111.

With respect to sensors 104, the third computational system 108 utilizes sensors 104 to create 3D model data that can be used to create 3D model(s).

Regarding physical object 106, the physical object 106, or variant thereof, is the object the user would like to produce using the AM device 110.

With respect to model repository 102, the model repository 102, relative to the third computational system 108, is an internally or externally stored repository of 3D model data that can be accessed by the third computational system 108 such that 3D model data can be transferred from the third computational system 108 to the computational systems that are located on board the AM device 110.

Regarding AM device 110, the AM device 110 is the physical hardware, driven by firmware, that deposits material in order to produce different geometries.

With respect to integrated computational system 111, the integrated computational system 111 is a system of computational devices or processors that utilize algorithms and 3D model data to perform a specific task automatically that would normally require significant human input when operating an AM system/device. Preferably, the integrated computational system 111 is located on the AM device 110.

Regarding second computational system 112, the second computational system 112 is located on the AM device 110. The second computational system 112 is connected to the first computational system 126 directly. The second computational system 112 contains a subset of computational systems or processors that automate the various steps that convert 3D model data to actionable operations by the AM device 110 to create a product. The second computational system 112 can also contain an internal model repository. The second computational system 112 can also be connected to additional sensors 140 on the AM device that help provide the second computational system 112 with updates about the operational state of the AM device 110.

With respect to automation processors 113, the automation processors 113 are located on or in conjunction with the second computational system 112 and use specific methodologies to individually automate hard to learn portions of the AM process.

Regarding model processor 114, the model processor 114 is used to collect 3D model data, use this information to create 3D models, and prepare them for the AM process by ensuring they can be fabricated by the AM device 110 with the desired material(s) and ultimately meet the desired design intent.

With respect to model repair processor 116, the model repair processor 116 ensures that the 3D model, provided by the model processor 114, is "watertight" in the sense that there are no anomalies that will prevent the file from being properly processed by the remaining processor.

Regarding model orientation processor 118, the model orientation processor 118 ensures the 3D model is oriented properly, relative to the material type and build volume of the AM device 110, such that there is the minimalist amount of failure risk when trying to fabricate the desired 3D model.

With respect to model placement processor 120, the model placement processor 120 ensures that the 3D model(s) is placed on the build platform, relative to the build volume, of the AM device 110 such that the risk of failure is minimized.

Regarding model slicing processor 122, the model slicing processor 122 takes into account the AM device hardware and uses this information to properly turn the 3D model(s) into machine code, often .gcode, so that the specific 3D model(s) is fabricated in the correct orientation on the correct portion of the build plate with settings for the specified material such that the risk of failure is minimized.

With respect to post slicing processor 124, the post slicing processor 124 creates the necessary machine code to perform start up and shut down routines that minimize maintenance of the AM device 110.

Regarding the first computational system 126, the first computational system 126, which is directly connected to the second computational system 112 and is also located on the AM device 110, converts received machine code into electric signals that power and direct the sensors 136, motors 138, gantry 134, and deposition device 132 on the AM device 110.

With respect to motors 138, motors 138 are the physical devices on the AM device 110 that drive the gantry 134 to move the gantry 134 around to the desired locations necessary to produce a specified geometric shape.

Regarding sensors 136, in this context, sensors 136 are the physical devices on the AM device 110 that determine work in unison with the first computational device 126 to produce feedback that helps ensure the correct geometric shape is achieved.

With respect to gantry 134, the gantry 134 is the physical system of components that move around producing the desired geometric shape for a given AM device coordinate system.

Regarding deposition device 132, deposition device 132 also includes conventional heating elements to ensure that the material is deposited in the correct locations to produce a desired geometric shape that mimics the 3D model(s) digital representation.

With respect to deposited material 130, deposited material 130 constitutes the layers of material produced by the deposition device.

Regarding product 128, the product 128 is the final component(s) produced by the AM device 110.

With respect to additional sensors 140, the additional sensors 140 are physical sensors attached to the second computational system 112 that collect, analyze, and provide operational data of the AM device 110 to the second computational system 112. Examples of these sensors can include imaging sensors, material usage sensors, and others.

Computing Device Embodiment

Figure 2:
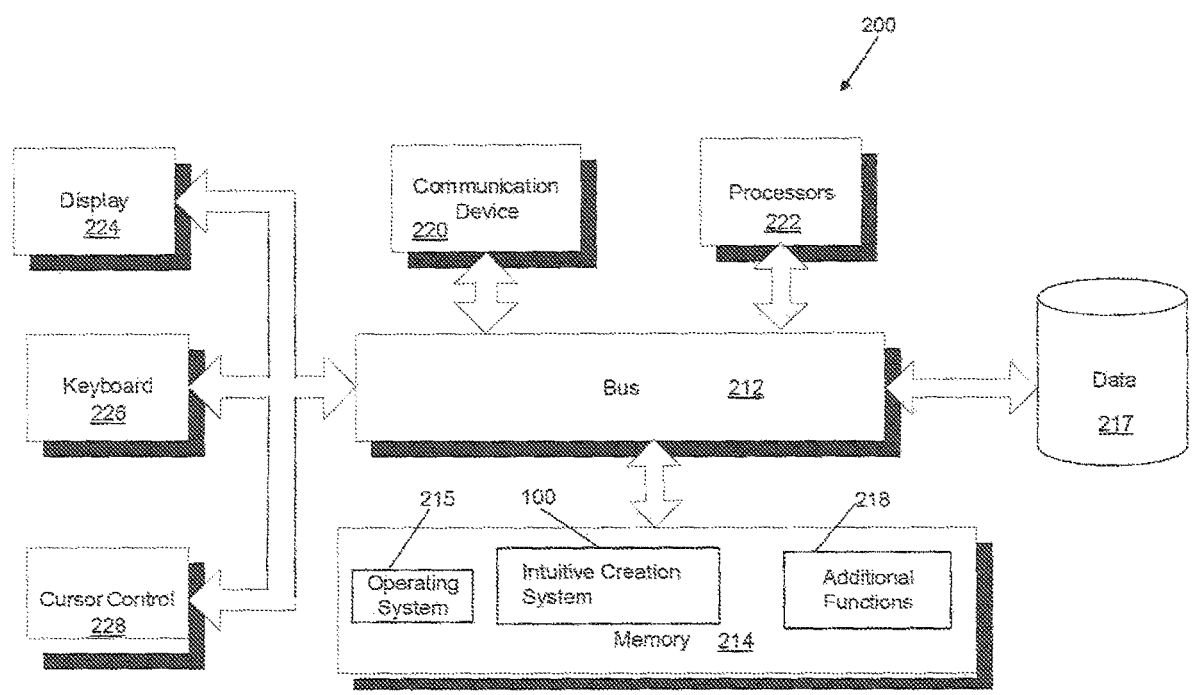
FIG. 2 illustrates a block diagram of a computing device operatively coupled to a system, according to an example embodiment.

FIG. 2 is a block diagram of intuitive creation system 200 in accordance with embodiments of the present invention. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 120 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection. Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, intuitive creation system 100, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 115, an intuitive creation system 100 that implements the user interaction functionality disclosed herein, as well as other applications modules 218. Operating system 215 provides operating system functionality for system 200. In some instances, intuitive creation system 100 may be implemented as an in-memory configuration. In some implementations, when system 200 executes the functionality of intuitive creation system 100, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218, intuitive creation system 100, or any other element of system 200 may include various modules of a Cloud Platform, a Cloud Infrastructure, a Digital Assistant, Cloud Applications, for example. A database 217 is coupled to bus 212 to provide centralized storage for system 216 and module 218 and to store, for example, data received by intuitive creation system 100 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, and the like). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Intuitive Creation Method

Figure 3A:
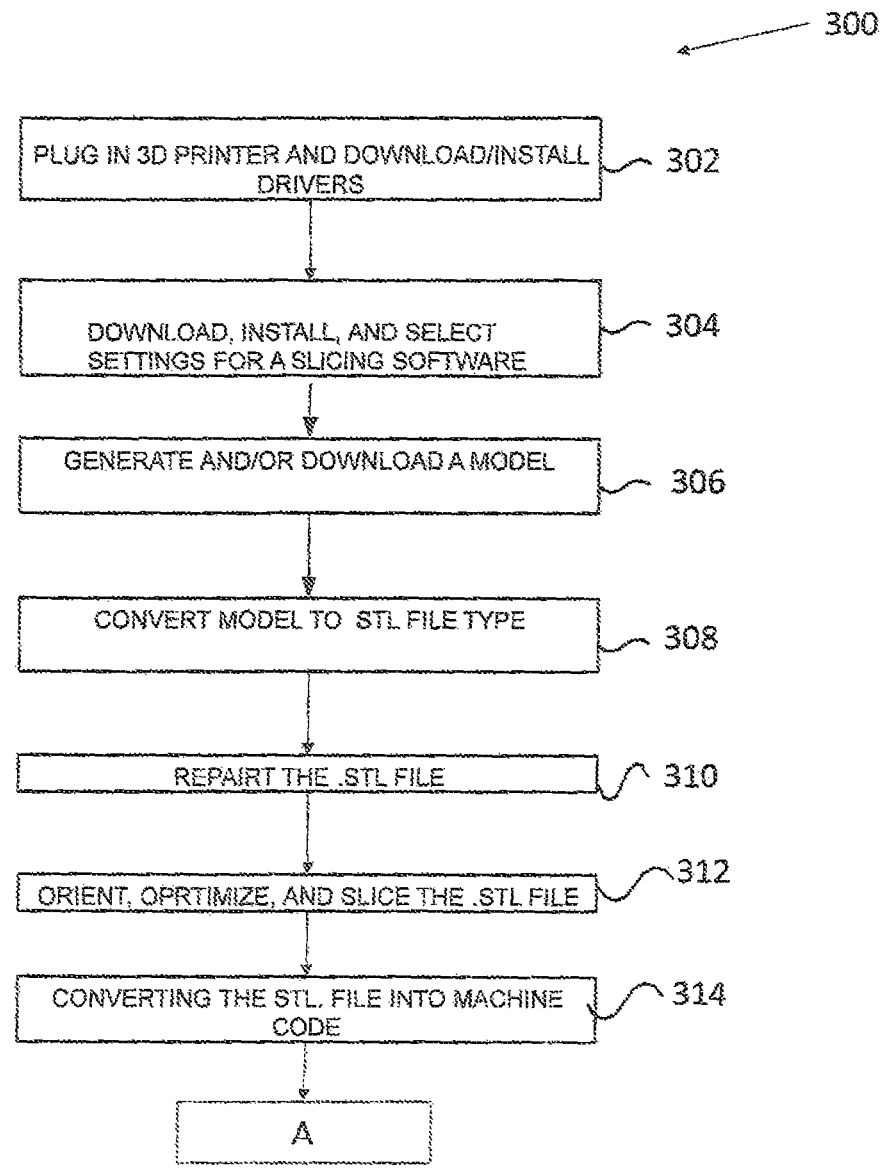
FIGS. 3a and 3b illustrate a flow diagram that a user would normally have to go through in order to print a part, according to an example embodiment.
Figure 3B:
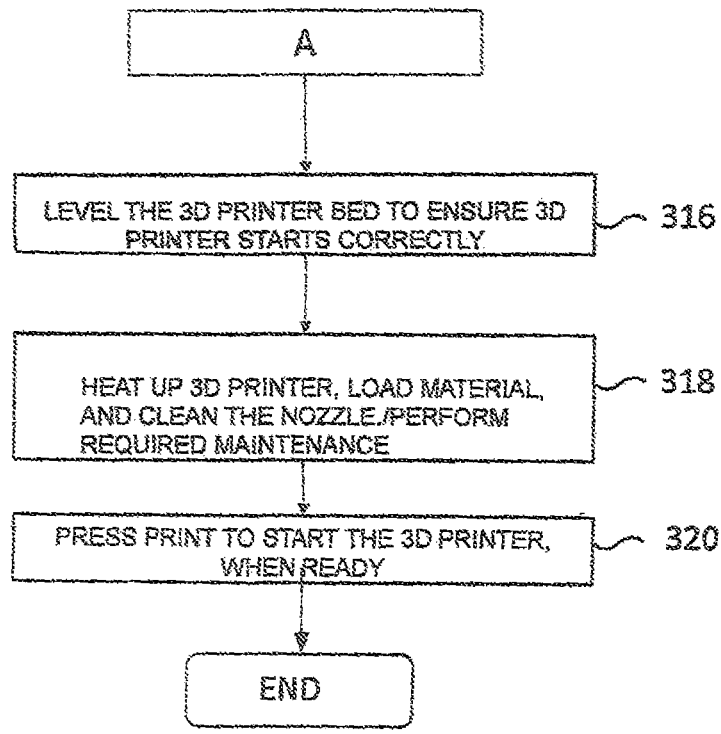

FIGS. 3a and 3b illustrate a flow diagram for using an intuitive creation system for additive manufacturing, according to an example embodiment. In some embodiments, the functionality of FIGS. 3a and 3b can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 3a and 3b can be performed by one or more elements of system 100 of FIG. 1 and/or system 200 of FIG. 2.

The Ten (10) Step Method

An example of this procedure for a home desktop AM device (3D printer) using Fused Deposition Modeling (FDM) or Fused Filament Fabrication (FFF) is generally defined in ten (10) steps of method 300 that a user would normally have to go through in order to print a part, as discussed in greater detail below. It is to be understood that file types and AM processes vary but most of these steps remain the same. Each step will be described in greater detail later.

At 302, plug in the 3D printer and make sure the computer (desktop or laptop, PC only usually) is able to communicate with the 3D printer. This may require the user to download and install drivers for the specific 3D printer and computer being utilized by the user.

At 304, download, install, and properly select settings for a slicing software that works with the 3D printer and the specific material the user is using.

At 306, generate and/or download a model.

At 308, convert the downloaded model to a .STL file type (this is the most common file type used in 3D printing) and adjust the .STL file's resolution for best results.

At 310, repair the STL file to make sure that there are not any errors leftover from the conversion in step 308.

At 312, orient, optimize, and slice the .STL file in the slicing software the user previously installed.

At 314, the slicing process converts the .STL file into machine code (G-code). Now the user must transfer this code to the user's 3D printer via a USB, SD card, wi-fi, etc.

At 316, level the bed of the user's build platform of the 3D printer to ensure that the 3D printer starts correctly.

At 318, heat up the user's 3D printer, load material, and clean the nozzle/perform required maintenance At 320, press print to start the user's 3D printer, when ready These steps, once learned and followed correctly, will lead a new user to successful use of their 3D printer. However, these steps can take days, weeks, months and even years to master depending on machine, material, and model complexity. Additionally, a user's experience with these ten steps can severally impact their thought processes when designing/creating models for specific 3D printers. This can further complicate the learning curve and how well any given 3D printer prints a specific 3D model based on a given user's design and process input.

The Three Categories of Operation

In order to eliminate the learning curve for the steps generally set forth above with respect to the method 300, the steps must first be broken down into three categories:

I. Creation or selection of a model(s) relative to a specific AM device 110.
II. Operation and maintenance of the physical AM device hardware.
III. Creation of instructions for a specified AM device 110 such that it can successfully create the initially selected model(s).

These three categories are critical to producing an AM component successfully. The first category represents the object destined for creation. The second category represents the physical hardware that will produce the desired object(s). The third category represents the interpretation of the initial object(s) into data that can be converted into executable actions by the physical AM device such that the object is printed properly.

In order for successful operation of an AM device 110 or a home desktop FFF 3D printer in this example, an operator must meticulously control the process variables. Each of the three categories described above contains variables critical to successful operation.

The individual operator interpretations of what design software, slicer setting(s), orientation(s), file resolution(s), file repair(s), material types, maintenance requirements, etc. in Categories I, II, and III are why AM remains an art much more so than an exact science.

The purpose of the solution presented by the present invention herein is to eliminate human interaction with these variables in order to produce components consistently and to minimize or eliminate the AM learning curve for the above ten (10) steps and category.

To accomplish this, a novel system as set forth in the present invention has been developed and tested to automate all the previously mentioned ten (10) steps of the AM process. This allows for the creation of an AM device 110 that allows a user, with no prior 3D printing experience or education, to create and/or fabricate consumer and retail goods with less than five (5) minutes of training.

It should be noted, some existing 3D printer manufacturers have attempted to solve the 3D printing learning curve problem by providing pre-prepared machine code for specific models. This solution functions for existing models, but still requires a highly trained operator to prepare machine code for every new or novel model that may exist. This is not a scalable solution.

To successfully print a model, the operator must control variables across all three of the previously mentioned categories. This means that the solution requires a specific combination of both hardware and firmware. This is discussed further in the implementation section for an example embodiment.

Prior to discussing implementation, below is discussed how to automate the previously discussed ten (10) steps for successful AM device operation.

Example Automation of the Ten Steps

For purposes of discussion, the above ten (10) steps have been relisted below, however particular attention should be paid to the subsets now located under each step. It is to be understood that these automations are relative to this particular example and may vary depending on the AM process. The 'easy to use' 3D printer solution is referenced below as "example AM system".

An example of this procedure for a home desktop example AM system (3D printer) using Fused Filament Fabrication (FFF) is defined in the ten (10) steps below.

A. As shown in step 302, plug in the 3D printer and make sure the computer (desktop or laptop, PC that the user is using in conjunction with the 3D printer) is able to communicate with the 3D printer. This may require the user to download and install drivers for the user's specific 3D printer and computer.
  i. This is probably the most prominent issue that initially creates problems with non-technical users. Currently, the majority of desktop 3D printers utilize open source software, drivers, and programs to communicate with any given printer. These are usually specific to each printer and may only work with some operating systems or personal computers. This means existing users must determine for themselves which specific software and/or drivers work on their specific personal computing device for their specific printer. This is only the first layer of the AM learning curve.
  ii. To eliminate this need, the method of the present invention for an AM system integrates a computational device into the 3D printer hardware setup such that all the necessary open or closed source software can be stored on board the AM system and come pre-installed from the manufacturer.
  iii. This allows anyone with a mobile computing device to connect to the 3D printer without having to download and install any software or drivers. By leveraging the fact most people have easy access to a mobile computing device, this solution greatly increases the amount of people capable of interfacing with this example AM system.
  iv. In addition to this, the user interface, preferably, should be browser based. For example, the new user connects to the printer over Wi-Fi with his/her mobile device, opens his/her browser, types in a specific website or IP address, and connects to the printer user interface via the browser. Since almost all mobile devices have a default browser, it is important that the interface is cross-browser compatible. This further increases the amount of people capable of using 3D printers as the method of the present invention allows anyone with a Wi-Fi connectable device to connect to this example AM system, which is one unique aspect of the present invention.

B. As shown in step 304, download, install, and properly select settings for a slicing software that works with the 3D printer and the specific material that is being used.
  i. Different printers can use a variety of slicer software(s), however some work better than others, depending on the printer. However, this causes the existing user to utilize a trial and error approach to determine what slicer software works best for his/her specific printer. More so, specific slicer settings are needed depending on the hardware and firmware setup of any given 3D printer which adds another learning curve to the process of setting up a 3D printer.
  ii. For this example, in the AM system, the hardware is controlled such that known working slicer software(s) and settings are pre-installed on the computational device that is located on the 3D printer and can be connected to with Wi-Fi enabled devices, as previously mentioned.

C. As shown in step 306, generate and/or download a model.
  i. Now that the example AM system can be connected to and the printer user interface can be accessed via a browser, the user must decide what to print. There are two options, create or download a pre-existing model file.
  ii. To create a model file, a new user must first download and install conventional Computer Aided Design (CAD) software. Again, this is software that typically requires specific high-performance computational devices and may not work with different operating systems.
  iii. Once installed, there is a steep learning curve for CAD even when designing the most simplistic of geometries.
  iv. Beyond installation and learning to use CAD programs, a user must be able to design parts specifically for printing on the specific printer and process they are using. Traditionally, an engineer must learn Design for Additive Manufacturing (DfAM) to perform this function appropriately. In this regard, DfAM also creates its own steep learning curve.
  v. The second option is to locate an applicable model file from a database. There are many of these databases, some free, some costly, but even searching for a specific model, that prints well, can be a challenge. Knowing what to look for when selecting a model file requires a certain amount of learned expertise as well. Without that, a new user can easily select a model file that cannot be made on his/her printer. However, normally, the model file must be saved locally and then re-uploaded to the printer interface. This requires additional technical know-how when navigating files systems for specific model files.
  vi. To reduce or eliminate the need for CAD software's, another unique aspect of the present invention is that the present invention allows for connected users to craft models in the real world out of local materials, take pictures of these crafted models with their mobile devices, and subsequently import them to a browser-based photogrammetry or 3D scanning based CAD program that is stored the printer's computational device and generates models based off the pictures taken by the new user. This process significantly reduces the need to know CAD in order to create model files and unique 3D printable products that solves problems for users and increases their quality of life. Additionally, the example AM system includes a browser-based topological optimization program combined with a mobile device based virtual reality system whereby a user can simply create a 3D shape outline using individual points and subsequently connect those points using artificial intelligence (A.I.) based on the creature slime mold. This A.I. 'connect the dots' approach is the most efficient means possible since the connected dots form a CAD model. This minimizes the design learning curve for new users and also makes designing possible with mobile devices which is another unique aspect of the present invention.

vii. To reduce or eliminate the problems faced by users when navigating various databases for model files to print, the AM system of the present invention contains a model search engine that sorts models from multiple databases based on most known working designs.

D. As shown in step 308, convert the model to a .STL file type (this is the most common file type used in 3D printing and it should be noted in this embodiment, .STL is considered interchangeable with any other 3D printable file type) and adjust the .STL file's resolution for best results.

i. Once a model is selected, the AM system of the present invention automatically converts it to a .STL format based on pre-set resolution settings if it is not already an .STL file.

E. As shown in step 310, repair the .STL file which makes sure there are not any errors leftover from the conversion in step 308.

i. Under the AM system of the present invention, a user unknowingly skips this step. Effectively after selecting a .STL file to print in the browser using the Wi-Fi enabled device, the user simply presses print and the AM system of the present invention takes it from there which is another unique aspect of the present invention. Another unique feature of the present invention is that the Wi-Fi enabled device is no longer needed for file processing after the user has selected a file to print and pressed the print button. Traditionally, some printers require a computer to be attached throughout the entirety of a print or all processing gets completed on a standalone computer and loaded onto a USB or SD card and manually brought to a printer prior to starting the print process.

ii. The first thing the AM system of the present invention does is repair the .STL file by using an automated algorithm to ensure that all selected files are properly tessellated and have water-tight triangle meshes. It is to be understood that this processing is performed on the computational devices that is part of the example AM system of the present invention or desktop home 3D printer in this case.

iii. Learning to repair .STL files usually means the user is well into the AM learn curve. Another unique aspect of the present invention is that the present invention prevents users from even having to know about this step.

iv. The repair algorithm completes this step much quicker than an operator.

F. As shown in step 312, orient, optimize, and slice the .STL file in the slicing software the user previously installed.

i. Once properly repaired, the AM system of the present invention passes the repaired .STL files to another algorithm that analyzes each file independently to determine and then sets each .STL file's proper orientation and position within the build envelope.

ii. It is to be understood that DfAM principles generally dictate that a user should orient models such that the least amount of surface area is overhanging as well as minimizing any areas with surface area that are less than 45-degrees from perpendicularity with the build platform which is also sometimes referred to as the substrate. For new users, this is often a difficult step to learn but it is a critical part of the learning curve, as proper orientation is necessary for successfully printing objects while minimizing the use of support material.

iii. Nonetheless, the automated algorithm chooses an orientation based on this 45-degree principle to maximize the chances of success, minimize support material, and consequently reduce the need for post processing of the completed print.

iv. This step is once again performed on the integrated computational device that is located on or within the AM device of the present invention. Likewise, this step is then completely eliminated from the AM learning curve which is another unique aspect of the present invention.

v. It is also to be understood that this step can computationally be completed in fractions of a second whereas an operator would previously have to manually set the orientation intuitively based on his/her prior experiences which is generally an unreliable and inconsistent approach but is all too often common place in AM.

G. As shown in step 314, the slicing process converts the .STL file into machine code (G-code), which the user must transfer to the 3D printer via USB, SD card, wi-fi, etc.

i. Under the AM system of the present invention, a pre-install of the appropriate slicer program for the specific hardware is already onboard the integrated computational device. Additionally, known working pre-set slicer settings are also onboard the computational device.

ii. After orientation, an algorithm automatically positions the repaired and oriented files within the AM system of the present invention to build volume which is pre-defined by the hardware.

iii. Once properly positioned, the pre-defined slicer settings are used by the pre-installed slicer program to generate machine code, often in the form of G-code. Note: The orientation algorithm will pass information along to the slicer to turn on support structures as necessary for files with significant overhangs that may cause failures.

iv. The AM system of the present invention then injects additional startup and shutdown G-code into the slicer generated machine code such that the printer automatically heats up to the right temperatures for a given material and uses a purge bucket to clean the nozzle and extruder material and to verify that the extruder is functioning properly.

v. This completely eliminates the need for a new user to spend significant time learning how to tune slicer settings for their specific hardware which is another unique aspect of the present invention.

H. As shown in step 316, level the bed of the build platform of the 3D printer to ensure that the 3D printer starts correctly.

i. Typically, new users generally must manually level the bed. Learning to level the bed is very much an art and not an exact science when dealing with different slicer settings, materials, and extruder hardware setups. Leveling the bed is also different for almost every different type of 3D printer which adds another layer to the learning curve. Even worse, fluctuations during each print means a user may have to relevel the bed after every build.

ii. To eliminate the leveling process, the AM system of the present invention contains an inductive probing sensor (not shown). In the AM system of the present invention, after the extruder has been automatically heated up to the correct temperature and cleaned prior to printing each build, the probe is used to determine how unlevel the bed is. Once determined, this information is stored in the firmware to automatically adjust z-height throughout the print such that a level surface is maintained.

iii. This completely eliminates the need for a user to learn how to level the bed or build platform which is another unique aspect of the present invention.

I. As shown in step 318, heat up the 3D printer, load material, and clean the nozzle/perform required maintenance i. This step is substantially reduced by automations in prior steps, which is another unique aspect of the present invention.

J. As shown in step 320, press print to start the 3D printer when ready i. Typically, on existing desktop printers, users generally press a button physically on his/her printer to begin the print process. This also requires the user to physically be present when starting the print. Another unique feature of the present invention is that the browser-based solution eliminates this and allows users of the AM system of the present invention to start prints remotely.

In this example, assuming that a .STL model has been selected, a new user can simply press the print button and be printing in less than five minutes. This effectively takes the ten (10) step process down to three (3) steps:

A. Create or Select a Model
B. Upload
C. Press Print

This is not possible without the AM system methods described above. This is also a much more consistent approach to AM device operation as the only operator influence over process variables is in regard to what object(s) are to be printed.

Creation of a consistent process with consistent outcomes, due to the algorithms that make up this method, means users can further turn their attention towards DfAM and designing custom solutions to solve problems in their daily life without having to spend time constantly tinkers and tweaking their 3D printer.

Implementation

Herein is described an implementation of the condensed ten (10) step automated process discussed theoretically above. The example AM system of the present invention constitutes a desktop 3D printer which uses a perfect marriage between hardware, firmware, and automated algorithms such that the ten (10) step process can be automated as much as possible. This leaves the desktop printer requiring minimal input from an operator in order to effectively create 3D printed objects.

It must be emphasized that in order to create an effective working version of this AM system of the present invention, the hardware, firmware, and algorithms must be built such that they work together in harmony and mitigate shortfalls found in each individual portion respectively.

When engineered and designed properly, it is possible to create an AM solution that is as simple as create/select a model, upload, and press print. This level of ease of use greatly increases the number of non-technical individuals capable of successfully operating a 3D printer which is another unique aspect of the present invention.

It is to be understood that FIG. 11 depicts this methodology approach along with how 3D model data is based through every element such that the entire AM fabrication process can be automated down to the point that a user only has to select/create a model, upload it, and press print. 3D model data can include but is not limited to CAD file types, sensor data such as images of an object, augmented reality data, virtual reality data, etc.

Methodology Summary

FIGS. 1-3*b* depict one potential embodiment of how to build a system and implement methods that allow a user to successfully create and/or produce an AM product without having to overcome a significant learning curve. The transmission of model data through the End-to-End intuitive AM creation system 100 shows how to build a system that makes AM as simple as creating/selecting a model, uploading, and pressing print. The methods of this system focus on minimizing the risk of failure for an AM device when producing a specific product. This is accomplished by controlling risk through elimination of variability caused by operator influence and human error.

Variability Control

When implementing this solution into any AM device or system, variability control or elimination is paramount. More often than not, failures during the AM process can be traced back to human error. This is common as the current state of the art requires operators to rely on their intuition and experiences.

Currently, the state of the art of AM, allows for human error to be introduced into the AM fabrication process starting with the conception of the desired component geometry in a CAD program or at any other point in the process which includes AM device maintenance, model orientation, etc.

The method(s) and system(s) described in FIGS. 1-3*b* primarily focus on the eliminating any required operator input such that variability can be minimized to produce an AM device that functions consistently and requires minimal operator input.

Previously, human influenced process steps therefore become controlled by known, working mathematical algorithms that produce consistent results and can account for significant variation in the geometries of the infinite amount of 3D model(s) that can exist and be printed successfully on a given AM device.

The primary side effect of this approach, as mentioned above, is the significant elimination of operator interaction with the underlying processes that allow an AM device to produce a given product successfully. Therefore, an operator is required to know less to usefully create and produce a product via an AM device. This, in effect, eliminates the known learning curve bottleneck that prevents mass adoption of AM by non-technical users.

A significant time sink for designers is the iterative process of creating a geometry, preparing for the AM process, running the build, and then assessing how well the AM device output correlates with the intended output. Minimization of variability in the AM process provides a platform for which consistent preparation and output can be expected. Having an automated preparation process allows designers to simulate how the AM device will react to existing and novel geometric designs. Simulation greatly reduces the iterative process of creating and testing new geometries; ultimately this approach saves designers a significant amount of time and results in faster determination of what geometries will print successfully. This allows current AM designers to spend their time focusing on finding innovative solutions for problems rather than preparing files and troubleshooting AM operations.

Model Processor Methodology

The third computation system 108 in this embodiment allows for a user/operator to create or provide the data necessary such that the model processor can create or utilize a 3D model.

Existing technologies such as virtual reality systems, augmented reality systems, cellphones, etc. are capable of creating and supplying 3D model data. However, the majority of non-technical users do not utilize these technologies to create 3D models and fabricate them using AM devices. This is primarily due to AM's difficult learning curve.

However, the system and methodology depicted in FIGS. 1-3*b* allow non-technical users to utilize these existing technologies to produce products using AM systems and devices by eliminating the need to fully comprehend the underlying processes that make a component ready to be fabricated on an AM device. Inherently, this approach increases adoptability of AM devices in that there will be no educational barrier to prevent non-technical users from creating and fabricating useful products.

The solution of the present invention not only eliminates the AM learning curve, but also significantly minimizes the need for non-technical user to understand how to create a CAD model that is designed for AM.

As an example, in this embodiment, the third computational system 108 may be comprised of a virtual reality system. The second computational system 112, which is connected to the third computational system 108, emits a program that can be 'played' by the user of the virtual reality system. This program is known as slime mold. Slime mold is a simplistic video game that uses artificial intelligence (A.I.) in the form of an artificial neural network to replicate the behavior of a eukaryotic organism. These organisms can function as single cells, but can also join together to create large multicellular structures that appear as a single organism. When appearing as a multicellular single organism, these eukaryotic organisms can begin acting in an intelligent manner. Example intelligent behavior is commonly produced when seeking out food or when exposed to environmental constraints that cause the multicellular organism to determine the most efficient solution to problems that impact survival.

Within AM, topological optimization—or the automated process of material layout based on design constraints, is of primary interest as it reduces the time required for a highly trained operator to discern the best solution. However, existing topological optimization programs are not intuitive and do not take the extra step of automatically preparing the design for the AM process. In the existing slime mold example, users use a virtual reality system, connected to a primary computational device, to place red food blocks in the general shape they are trying to create and place grey obstacle blocks in areas they do not want material. Then the user releases slime mold into the environment at which point the slime mold, using A.I., determines the most efficient means of connecting the red blocks while also avoiding the grey blocks. The user then is able to adjust the thickness of the slime mold organism and remove blocks as necessary to create a desired shape. This design process is therefore using slime mold as a tool for automatic topological optimization. Slime mold also incorporates DfAM principles such that the unique shapes and structures generated by users are automatically optimized for the AM process using simulations of the automated (10) step process. Additionally, the combination of this topological optimization method with virtual reality creates a novel and intuitive environment that anyone can learn and use in minutes whereas traditional CAD and topological optimization strategies take hundreds of hours to learn.

The user can then opt to print the design they made using Slime mold. The present invention has demonstrated this example and has shown that a user, with no prior training, can learn to design and successfully print a geometry of their own creation within minutes and have that model automatically converted to an .STL file, and passed to the model repair processor. This is currently unachievable with other AM devices and their accompanying systems and methods. The only reason this is possible is through the elimination of both the CAD and AM learning curves.

Model Repair Processor Methodology

State of the art AM devices require an operator to design a component and then translate that component to a file type that is applicable with the type of slicer utilized by a given AM device or process. Currently, 3D model designs are most often translated to .STL files which are most often a single walled, hollow representations of a given 3D model. The walls of .STL files are made of triangles and .STL files can have higher or lower resolutions based on the amount of triangles present.

.STL files are effectively triangle meshes. Triangles of an .STL file have several traits which include three (3) points denoting their location and what is considered the inside and outside faces of a given triangle. These are used to be able to ensure every triangle has a known position when connected to other triangles on all three sides.

A good example is trying to map the surface of a ball with triangles. This will never yield a true digital representation of a perfect sphere, however, the more you decrease the size of the triangles, the higher resolution you can achieve. It should be noted that higher resolution is correlated with large file size which can take longer to process in preparation for the printing process.

However, with more complex 3D model geometries, conversion to a .STL file can be cumbersome. A common error is producing an .STL file that is missing a triangle. This means that the file is not technically 'watertight' in a digital sense and would cause issues when trying to slice the file.

Other problems that can exist include triangles being flipped meaning the inside face of a triangle is facing outward or vice versa. This can cause a slicer to malfunction and considered the outside of a part the inside or vice versa which means the printer will produce a geometry that may be completely foreign.

To solve these issues, an algorithm can mathematically check all triangles positions, connections, and face directions in an iterative manner to ensure that there are no missing triangles, all triangles are connected appropriately, and the triangles are facing the correct direction. If any holes or issues exist in the triangular mesh, then the same iterative process can be used to produce triangles to fill holes or flip the face direction of any given triangle.

Model Orientation Processor Methodology

Continuing with the above example, once the .STL file is repaired, it must be oriented properly for successful fabrication and the minimization of support material which adds another layer of know-how in the form of post processing. Therefore, to minimize the amount of post processing know-how required by an operator of the AM device, an orientation is chosen to fabricate the component to prevent failure during fabrication and to minimize the need for support material.

To do this, the .STL triangular mesh can be placed on a virtual plane using its default orientation. The virtual plane constitutes a representation of the build plate on the physical AM device.

Once placed in this virtual environment, it becomes possible to iterate through and find the angle by which every triangle is placed relative to the virtual build plate. This then allows the user to mathematically determine the finite number of orientations that produce the minimal number of triangles with the largest overhangs that would be most likely to fail or require support material. After a satisfactory orientation is achieved, the .STL file is re-saved so that this new orientation becomes the default. It should be noted that it is also possible to apply this same method such that orientation is driven by minimization of print speed, height, structural integrity, etc.

Model Placement Processor Methodology

After proper orientation is achieved, the .STL file must be placed within the virtual build envelope and on the virtual build plate to maximize space utilization and minimize risk of failure. For this example, the .STL file is placed in the center for ease. However, the build plate substrate will eventually lose its ability for printed material to stick to it if parts are always printed in the same spot. To minimize this problem, .STL files can be randomly placed by a mathematical algorithm. This minimizes the risk of repeating the same placement twice which, in turn, should wear the entire build surface evenly over, as opposed to one area getting warn out quickly.

Model Slicing Processor Methodology

After the .STL file representation of the user generated slime mold shape has been repaired, oriented, and placed, the .STL file is sliced into layers of machine code for a given material and geometry. The machine code is outputted in the form of .gcode and automatically passed to the first computational system 126 which will translates the code into physical movement of the gantry 134.

Post Slicing Processor Methodology

After the machine .gcode for the model is generated, additional .gcode is generated and placed in the beginning and the end of the previously created .gcode file. This beginning and end additions to the .gcode are used to create movement of the gantry 134 that decreases the need for maintenance and increases the likelihood of a successful print. Examples include pre and post purge of the deposition device or extruder which makes sure that the nozzle has material ready to be extruded into the desired product.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A system for manufacturing Additive Manufactured products comprising:
   a first computational system located on an additive manufacturing device;
   a second computational system operatively connected to the first computational system and located on the additive manufacturing device, wherein the second computation system is used to convert three-dimensional (3D) model data by the additive manufacturing device in order to create a 3D product;
   a plurality of automation processors located within the second computational system, wherein the plurality of automation processors further comprises:
      a model processor, wherein the model processor is used to collect 3D model data,
      a model repair processor operatively connected to the model processor, wherein the model repair processor determines if the 3D model data provided by the model processor contains any anomalies that will prevent the 3D model data from being further processed and, if anomalies exist, correct the anomalies,
      a model orientation processor operatively connected to the model repair processor, wherein the model orientation processor determines a desired 3D model orientation,
      a model placement processor operatively connected to the model orientation processor, wherein the model placement processor places a 3D model in a proper location on a build platform of the additive manufacturing device,
      a model slicing processor operatively connected to the model placement processor, wherein the model slicing processor converts the 3D model into a first machine code so that the 3D model is fabricated in the desired 3D model orientation on a desired portion of the build platform, and
      a post slicing processor operatively connected to the model slicing processor, wherein the post slicing processor creates a second machine code that causes the additive manufacturing device to perform start up and shut down routines;
   a third computational system operatively connected to the first and second computational systems, wherein the third computational system allows for a user to interact with the additive manufacturing device to create the 3D model data that is used to create or find the 3D model;
a model repository operatively connected to the third computational system; and
a plurality of first sensors operatively connected to the third computational system.

2. The system, according to claim 1, wherein the system further comprises;
a physical object that is an object that is being produced by the additive manufacturing device such that the first set of sensors interacts with the physical object to provide information to the third computational system regarding the physical object.

3. The system, according to claim 1, wherein the additive manufacturing device further comprises;
a plurality of motors;
a plurality of second sensors operatively connected to the plurality of motors;
a gantry operatively connected to the plurality of second sensors; and
a deposition device operatively connected to the gantry such that the deposition device deposits an amount of a material onto the gantry to produce an additive manufactured product.

4. The system, according to claim 1, wherein the model repository further comprises:
an internally or externally stored repository of 3D model data of an additive manufactured product to be produced.

5. The system, according to claim 4, wherein the model processor is used to collect 3D model data of the additive manufactured product to be produced from the model repository and use this information to produce the additive manufactured product.

6. An apparatus for manufacturing Additive Manufactured products comprising:
a first computational system located on an additive manufacturing device;
a second computational system operatively connected to the first computational system and a plurality of additional sensors and located on the additive manufacturing device, wherein the second computation system is used to convert three-dimensional (3D) model data by the additive manufacturing device in order to create a 3D product;
a plurality of automation processors located within the second computational system, wherein the plurality of automation processors further comprises:
a model processor, wherein the model processor is used to collect 3D model data,
a model repair processor operatively connected to the model processor, wherein the model repair processor determines if the 3D model data provided by the model processor contains any anomalies that will prevent the 3D model data from being further processed and, if anomalies exist, correct the anomalies,
a model orientation processor operatively connected to the model repair processor, wherein the model orientation processor determines a desired 3D model orientation,
a model placement processor operatively connected to the model orientation processor, wherein the model placement processor places a 3D model in a proper location on a build platform of the additive manufacturing device,
a model slicing processor operatively connected to the model placement processor, wherein the model slicing processor converts the 3D model into a first machine code so that the 3D model is fabricated in the desired 3D model orientation on a desired portion of the build platform, and
a post slicing processor operatively connected to the model slicing processor, wherein the post slicing processor creates a second machine code that causes the additive manufacturing device to perform start up and shut down routines;
a third computational system operatively connected to the first and second computational systems, wherein the third computational system allows for a user to interact with the additive manufacturing device to create the 3D model data that is used to create or find the 3D model;
a model repository operatively connected to the third computational system; and
a plurality of first sensors operatively connected to the third computational system.

7. The apparatus, according to claim 6, wherein the system further comprises;
a physical object that is the object that is being produced by the additive manufacturing device such that the first set of sensors interacts with the physical object to provide information to the third computational system regarding the physical object.

8. The apparatus, according to claim 6, wherein the additive manufacturing device further comprises;
a plurality of motors;
a plurality of second sensors operatively connected to the plurality of motors;
a gantry operatively connected to the plurality of second sensors; and
a deposition device operatively connected to the gantry such that the deposition device deposits an amount of a material onto the gantry.

9. The apparatus, according to claim 6, wherein the model repository further comprises:
an internally or externally stored repository of 3D model data.

10. The apparatus, according to claim 9, wherein the model processor is used to collect 3D model data from the model repository and use this information to create and browse 3D models.

* * * * *